UNITED STATES PATENT OFFICE.

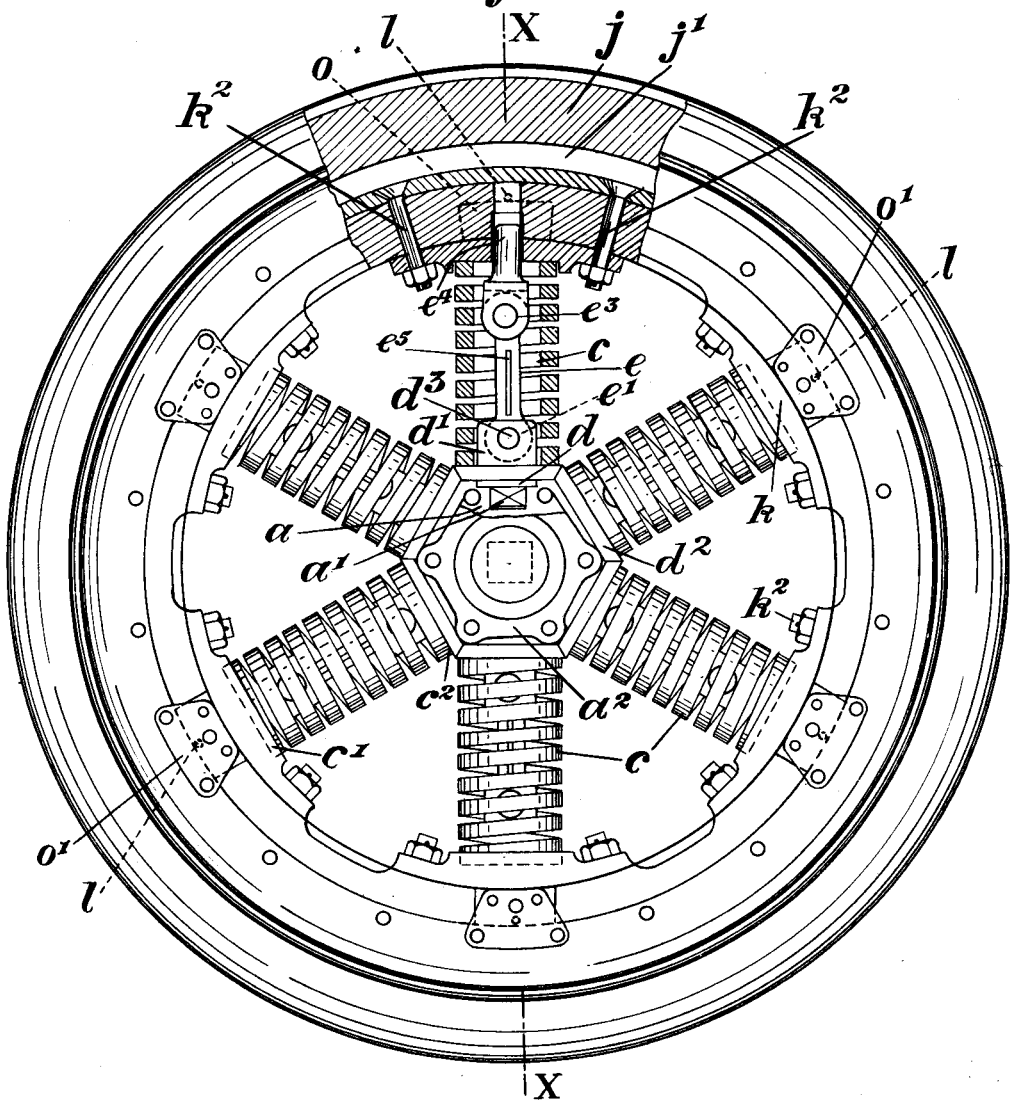

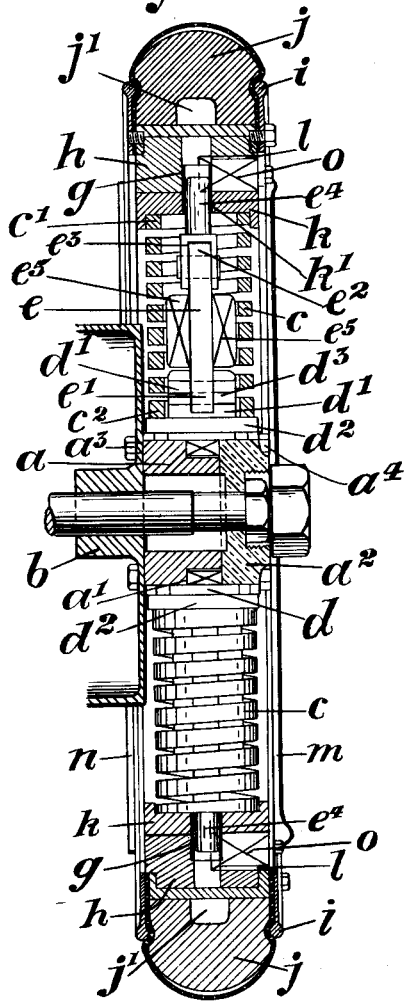

THOMAS ARTHUR HARGRAVES AND EDWARD JAMES McCORD, OF BELFAST, IRELAND, ASSIGNORS OF ONE-THIRD TO THOMAS STERLING, OF BELFAST, IRELAND.

VEHICLE-WHEEL.

1,035,004.      Specification of Letters Patent.      Patented Aug. 6, 1912.

Application filed August 5, 1911. Serial No. 642,503.

*To all whom it may concern:*

Be it known that we, THOMAS ARTHUR HARGRAVES and EDWARD JAMES MCCORD, both subjects of the King of Great Britain and Ireland, and both residing at Belfast, Ireland, have invented certain new and useful Improvements in Vehicle-Wheels, of which the following is a specification.

This invention relates to the wheels of motor or other vehicles, its object being to provide an improved resilient wheel.

Under our invention we provide between the rim and the hub a number of arms, one end of each arm being pivoted to the hub while its other end works in a socket provided on or in the underside of the rim, thereby making the hub "float" relative to the rim, and round each arm we provide a spring bearing at one end on the hub, and at the other end held in a socket provided on the underside of the rim, the spring being free to move radially, their movement sidewise and circumferentially being limited by the arms which are so made that they almost touch the inner circumference of the springs thereby greatly strengthening the springs when they are subjected to circumferential twist or other movement due to any movement of the rim relative to the hub.

In order that our said invention may be clearly understood we have hereunto appended two explanatory sheets of drawings whereon we have shown, by way of example, a motor car wheel made in accordance with our invention.

Figure 1 is a side elevation of the wheel, part being in section to show the details more clearly. Fig. 2 is a cross section on the line X—X, Fig. 1, the spring being shown full on the lower half.

On the drawings the same reference letters wherever repeated indicate the same parts.

In the subsequent description of the wheel we have particularly referred to the upper spoke and its accessories and for the sake of brevity have treated the spoke as if being always in the vertical position.

In carrying out our invention for a motor car wheel as shown in the drawings we make the hub $a$ with, in this case, a hexagonal periphery having six sockets $a^1$ therein, one in each flat of the hexagon and we preferably make the end $a^2$ of the hib removable and so that it forms one side of each socket $a^1$ by securing it against the part $a$ and on the end of the axle $b$ by means of bolts $a^3$ and nuts $a^4$ or otherwise. The sockets $a^1$ are preferably rectangular in shape as shown in the drawings and into them radially projecting forked pieces $d$ are fitted, each of which has below its forks $d^1$ a plate $d^2$ which acts as a bottom bearing plate for the corresponding spiral spring $c$. The forks $d^1$ of each forked piece $d$ are shaped to fit inside the corresponding spring $c$ and between the forks $d^1$ of each fork piece $d$ and suitably secured to them is a pivot pin $d^3$ and on each pin $d^3$ one end $e^1$ of a radial arm or spoke $e$ is pivotally secured, the other end $e^2$ of the said arm terminating in a pivoted fork piece $e^3$ having a portion $e^4$ adapted to slidably fit in a socket or bushing $g$ provided in the underside of the wheel rim $h$. The rim $h$, in the example shown, is made of wood and has fitted in suitable recesses a series of blocks $o$ on the removal of which the said sockets or bushings $g$ can be moved laterally from the rim, each block being secured in position by means of a plate $o^1$ secured thereon and on the face of the rim, and the rim $h$ has a tire securing rim $i$ suitably fastened to it in which any suitable form of solid or other tire $j$ may be held, in any usual manner.

Around each arm or spoke $e$ a spiral spring $c$ is provided, one end $c^2$ of which bears on the bottom bearing plate $d^2$ while its other end $c^1$ is received within a cap or socket $k$ which is concentrically arranged relative to the socket or bushing $g$ and suitably secured by bolts $k^2$, or their equivalent to the underside of the rim $h$. This cap or socket $k$ has a central opening $k^1$ and, as shown in the drawings, it is preferably adapted to receive into its central opening one end of the socket or bushing $g$, the latter being screwed or otherwise secured therein, and the tire $j$ is preferably made with an internal and circumferential groove $j^1$ into which the outer ends of the bolts $k^2$ may be pressed in such manner as to permit of the cap or socket $k$ being moved laterally from the rim. Each radial arm or spoke $e$, has a number of projecting wings or parts $e^5$ which are adapted to fit inside the spring $c$. These wings $e^5$ extend for the greater part of the length of the arms $e$ between the pivoted ends $e^1$ and $e^2$ and while they permit of free radial movement of the springs c they prevent any twisting or side strain of the springs c or circumferential movement of the rim relative to the hub. The sockets $g$ within which the ends $e^4$ of the arms or spokes e are adapted to slide would, of course, be lubricated in a suitable manner, and, in the example shown in the drawings, passages $l$ are provided by means of which the sockets $g$ may be lubricated. The passages $l$ may, of course, if desired, be provided at their outer ends with suitable dust proof covers, and in order to prevent the ingress of dust and dirt to the springs, arms, etc., we preferably provide an outer guard m of some transparent material, or other material, said guard m being either flexible and secured to the rim $i$ or slidably secured in position so as to allow for the radial movements of the rim relative to the hub. A similar guard n would be provided for the inner side of the wheel and modified in shape to suit the requirements at the inner side of the wheel.

The vehicle wheel hereinbefore described is so constructed that a free radial movement of the hub a relative to the rim $h$ is permitted by the springs c and owing to to the double jointed nature of the spokes or arms e and to the slidable sockets for the rim fork pieces a certain amount of relative movement of the hub a and rim $h$ is also permitted in the direction of the plane of the wheel but owing to the laterally extending wings or enlargements on the spokes no sideward twisting or displacement of the springs relative to their spokes may take place, and consequently there can be no sideward twist or movement of the rim relative to the hub and the springs are retained in proper relation to their spokes at all times.

The springs c are put into position around the arms or spokes e and between the plate $d^2$ and cap or socket k with a little compression on them so as to prevent any rattle or tendency to spring out and if desired any known means may be provided for adjusting the compression on the springs.

The rim $h$ and the tire $j$ may be of any desired construction.

Having now fully described our invention what we claim and desire to secure by Letters Patent is:—

1. A vehicle wheel comprising in combination a hub having a plurality of recesses or sockets formed in its periphery, fork pieces adapted to fit into said recesses or sockets, a series of spokes having their one ends pivotally secured thereto, a rim having a series of sockets therein, fork pieces slidable in said sockets and to which the other ends of the spokes are pivotally secured, springs surrounding the spokes and extending from the hub to the rim and laterally extending enlargements on the spokes.

2. A vehicle wheel comprising in combination a hub, a series of fork pieces fitted therein, the hub having a plurality of recesses or sockets formed in its periphery to receive corresponding projections on the fork pieces, the hub being made in two parts so that when disassembled the removal of one part of the hub takes away one lateral side of each of the recesses to admit of the ready withdrawal or insertion of the fork pieces with spokes and springs complete, a series of spokes having their one ends pivotally secured thereto, a rim having a series of sockets therein, removable blocks inserted in the rim and forming one side of each rim socket, means for securing the blocks in place, fork pieces slidable in said sockets and to which the other ends of the spokes are pivotally secured, springs surrounding the spokes and extending from the hub to the rim and laterally extending enlargements on the spokes.

3. A vehicle wheel comprising in combination a hub of polygonal shape having a recess or socket formed in each face of the polygon, a rim, a series of fork pieces at the hub having projecting pieces thereon adapted to fit into the sockets in the hub and to form the driving members between the hub and the spokes, and a flange on each hub fork piece, a spoke pivotally secured at one end to each hub fork piece and having pivotally secured to its other end a fork piece which is adapted to fit slidably in a socket in the rim, springs surrounding the spokes and extending from the rim to the flanges on the fork pieces at the hub, and laterally extending enlargements on the spokes.

4. A vehicle wheel comprising a hub, a series of sockets in the hub, a rim, a series of sockets in the rim, fork pieces fitted in the sockets in the hub, fork pieces fitted slidably in the sockets in the rim, spokes pivotally connected with said fork pieces and extending therebetween, a flange on each fork piece at the hub, a cap or socket secured to the underside of the rim and having a hole therein through which the fork piece at the rim is adapted to slide, springs surrounding said spokes and extending from the caps or sockets at the underside of the rim to the flanges on the fork pieces at the hub and laterally extending flanges on the spokes adapted to be a slidable fit within said springs.

5. A vehicle wheel comprising in combination a hub, having a plurality of recesses or sockets formed in its periphery, the hub being made in two parts so that when disassembled the removal of one part also removes one lateral side of each recess, a rim, a series of sockets in the rim, removable blocks inserted in the rim and forming one side of each rim socket, fork pieces fitted in the sockets in the hub and fork pieces fitted slidably in the sockets in the rim and removable by the disassembling of the hub parts and withdrawal of the corresponding rim block, spokes pivotally connected with said fork pieces and extending therebetween, a flange on each fork piece at the hub, a cap or socket secured to the underside of the rim and having a hole therein through which the fork piece at the rim is adapted to slide, springs surrounding said spokes and extending from the caps or sockets at the underside of the rim to the flanges on the fork pieces at the hub and laterally extending flanges on the spokes adapted to be a slidable fit within said springs.

In testimony whereof we affix our signatures in presence of two witnesses.

THOMAS ARTHUR HARGRAVES.
EDWARD JAMES McCORD.

Witnesses:
ANDREW HAMILTON,
JAMES AIKEN.